(12) United States Patent
Donabedian et al.

(10) Patent No.: US 10,913,500 B2
(45) Date of Patent: Feb. 9, 2021

(54) BODY STRUCTURE REINFORCEMENT, BODY STRUCTURE AND RELATED METHOD

(71) Applicant: FORD GLOBAL TECHNOLOGIES, LLC, Dearborn, MI (US)

(72) Inventors: Edgar Edward Donabedian, Livonia, MI (US); John Joyce, Saline, MI (US); Michael Joseph Lee, Ann Arbor, MI (US); Michael James Freeman, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 16/398,974

(22) Filed: Apr. 30, 2019

(65) Prior Publication Data

US 2020/0346696 A1 Nov. 5, 2020

(51) Int. Cl.
| | | |
|---|---|---|
| B62D 29/00 | (2006.01) | |
| B62D 21/02 | (2006.01) | |
| B62D 65/02 | (2006.01) | |
| B33Y 80/00 | (2015.01) | |
| B62D 25/04 | (2006.01) | |
| B33Y 10/00 | (2015.01) | |

(52) U.S. Cl.
CPC .............. *B62D 29/00* (2013.01); *B33Y 80/00* (2014.12); *B62D 21/02* (2013.01); *B62D 25/04* (2013.01); *B62D 29/001* (2013.01); *B62D 65/024* (2013.01); *B33Y 10/00* (2014.12)

(58) Field of Classification Search
None
See application file for complete search history.

(56) References Cited

U.S. PATENT DOCUMENTS

| | | | | |
|---|---|---|---|---|
| 4,378,395 | A * | 3/1983 | Asoshina | B32B 27/08 428/158 |
| 5,806,919 | A * | 9/1998 | Davies | B62D 29/002 296/187.02 |
| 6,321,793 | B1 * | 11/2001 | Czaplicki | B29C 44/18 138/172 |
| 7,093,393 | B2 | 8/2006 | Hock et al. | |
| 7,318,873 | B2 * | 1/2008 | Czaplicki | B29C 70/70 156/293 |
| 7,513,564 | B2 * | 4/2009 | Yamazaki | B62D 29/002 296/187.02 |
| 8,530,015 | B2 * | 9/2013 | Mendiboure | B62D 29/002 428/36.5 |
| 8,720,984 | B2 * | 5/2014 | Kurogi | B62D 25/025 296/205 |
| 8,998,296 | B2 * | 4/2015 | Eipper | B62D 21/09 296/187.01 |
| 9,126,247 | B2 * | 9/2015 | Kim | B21B 1/12 |
| 9,630,659 | B2 * | 4/2017 | Kurokawa | B62D 21/02 |
| 9,789,922 | B2 | 10/2017 | Dosenbach et al. | |
| 9,828,034 | B2 * | 11/2017 | Cazes | B62D 25/04 |

(Continued)

*Primary Examiner* — Lori L Lyjak
(74) *Attorney, Agent, or Firm* — David Coppiellie, Esq.; Carlson, Gaskey & Olds, P.C.

(57) ABSTRACT

A body structure reinforcement includes a reinforcement body and a connecting flange integral with the reinforcement body. Body structures incorporating one or more shell structures and the body structure reinforcement are disclosed along with methods for making the body structure reinforcement and the body structures.

18 Claims, 10 Drawing Sheets

(56) References Cited

U.S. PATENT DOCUMENTS

| | | | |
|---|---|---|---|
| 2002/0033618 A1* | 3/2002 | Kwon | B62D 29/002 296/203.03 |
| 2005/0127145 A1* | 6/2005 | Czaplicki | B32B 15/016 228/235.2 |
| 2016/0046328 A1* | 2/2016 | Steffens | B21D 47/01 296/193.06 |
| 2016/0067778 A1* | 3/2016 | Liu | B23K 26/0624 419/53 |
| 2016/0121936 A1 | 5/2016 | Patberg et al. | |
| 2016/0289491 A1* | 10/2016 | Li | C08G 59/686 |
| 2016/0297480 A1* | 10/2016 | Nakayama | B60J 5/06 |
| 2017/0057558 A1 | 3/2017 | Hillebrecht et al. | |
| 2017/0320531 A1* | 11/2017 | Serotta | B62J 15/02 |
| 2018/0099461 A1* | 4/2018 | Matthews | B29C 64/112 |
| 2018/0264679 A1* | 9/2018 | van Rooyen | C04B 35/622 |
| 2018/0371249 A1* | 12/2018 | Bihari | C08G 81/00 |
| 2019/0030605 A1 | 1/2019 | TenHouten et al. | |
| 2019/0047031 A1 | 2/2019 | Hahnlen et al. | |
| 2019/0061826 A1* | 2/2019 | Kaneko | B62D 25/04 |
| 2019/0263454 A1* | 8/2019 | Linsel | B62D 27/065 |
| 2020/0207031 A1* | 7/2020 | Georgeson | B29C 33/3842 |

* cited by examiner

BODY STRUCTURE REINFORCEMENT, BODY STRUCTURE AND RELATED METHOD

TECHNICAL FIELD

This document relates generally to the motor vehicle and autonomous vehicle fields and, more particularly, to a new and improved body structure reinforcement, new and improved body structure incorporating that body structure reinforcement, a new and improved method of making a body structure reinforcement and a new and improved method of making a body structure.

BACKGROUND

A key objective of body structure development for autonomous and motor vehicles is to have a lightweight but strong body. Many original equipment manufacturers (OEMs) employ similar design and manufacturing methods and practices that incorporate various materials to help achieve this goal. These materials, especially steel and aluminum, are typically formed parts through a stamping process that are mechanically joined together to create load bearing structures. Automotive OEMs have become quite skilled through the use of this process and resulting geometry to construct suitable body structures.

There are physical geometric and packaging constraints and limitations that prohibit and hinder a more efficient result. For example, consider the construction of a typical car B-pillar where there are stamped inner and outer panels that are joined together to complete and comprise a geometric section. Typically internal reinforcements are also required within the pillar. These internal reinforcements are also typically restrictive stampings and subsequently sub-assembled to the inner and outer panels.

The resulting pillar system is typically suitable to manage the loads. However, in order to achieve this proper structure, the design teams must balance overall pillar size and utilizing the conventional stamped structure approach may limit this while still meeting performance measures. It is very difficult, and impossible in many instances, to integrate multiple stamped panels or components to reduce overall part count. Additionally, using a stamped construction, where multiple parts/stampings must come together to form structural joints, the design is restricted through this geometry and part stamping stack up. Due to forming and joining limitations, these joints must contain overlaps and notches to help respective parts to nest and are typically required to be greater than 90 degrees resulting in a potentially less efficient design.

This document relates to a new and improved body structure reinforcement as well as to a new and improved body structure incorporating that new and improved body structure reinforcement that are adapted to address and overcome the aforementioned challenges and limitations to body structural development for autonomous and motor vehicles.

SUMMARY

In accordance with the purposes and benefits described herein, a new and improved body structure reinforcement is provided. That body structure reinforcement comprises a reinforcement body and a connecting flange integral with the reinforcement body. In at least one of the many possible embodiments of the body structure reinforcement, the reinforcement body and the connecting flange are formed as a single unitary body by additive manufacturing (see ASTM-F42) or 3-D printing. For purposes of this document the terminology "single unitary body" refers to a one-piece part that may be subsequently used in the construction of a body structure for a motor vehicle or an autonomous vehicle. In an alternative embodiment, the connecting flange includes a plurality of windows and the reinforcement body is additive manufactured from an additive manufacturing material so that a portion of the additive manufacturing material extends through the plurality of windows to lock the reinforcement body and the connecting flange together as a single unitary body for subsequent construction of a vehicle body structure.

In some embodiments the connecting flange may include a lug, turned flange or stiffener embedded in the additive manufacturing material. Depending on the application, the flange may only include the plurality of windows for interlocking with the reinforcement body, may only include the lug embedded in the additive manufacturing material for interlocking the flange and reinforcement body or may include both the plurality of windows and the lug.

In accordance with an additional aspect, a new and improved body structure is provided that is lightweight, strong, compact and easier to assemble. That body structure comprises a body structure reinforcement having a reinforcement body having a first connecting flange and a first shell structure having a second connecting flange. The reinforcement body and the first connecting flange of the body structure reinforcement are an integral or single unitary body. In the assembled body structure, the first connecting flange is secured to the second connecting flange.

In at least one possible embodiment of the body structure, the reinforcement body and the first connecting flange are a single unitary body formed by additive manufacturing of the body structure reinforcement from any appropriate additive manufacturing materials suitable for such an application.

Alternatively, in at least one embodiment of the body structure, the first connecting flange is a metal component including a plurality of windows and the reinforcement body is additive manufactured from an appropriate additive manufacturing material so that portions of the additive manufacturing material extend through the windows in order to interlock the first connecting flange and the reinforcement body together. Still further, the first connecting flange may include a lug that is embedded in the additive manufactured material of the reinforcement body in order to further secure the connection. Here it should be appreciated that the first connecting flange may include both the plurality of windows and the lug, the plurality of windows without the lug or the lug without the plurality of windows.

In one or more embodiments, the first shell structure may be a body side outer and the reinforcement body may include a reinforcing tubular shaped structure.

In still other embodiments the body structure further includes a second shell structure having a third connecting flange. In the assembled states such a body structure includes the first connecting flange sandwiched between the second connecting flange of the first shell structure and the third connecting flange of the second shell structure.

In one or more of the many applications for such a body structure, the first shell structure may be a floor side inner while the second shell structure may be a rocker outer. In some embodiments that body structure may further include a B pillar inner having a fourth connecting flange connected to the first connecting flange, the second connecting flange and the third connecting flange. Further, the reinforcement component of that body structure may be a B pillar node connecting and reinforcing the B pillar inner, the floor side inner and the rocker outer. In some embodiments, the reinforcement body may include a first bulkhead reinforcement and a second bulkhead reinforcement held in an outer casing.

In still other applications, the body structure may comprise a reinforced B pillar wherein the first shell structure is a B pillar inner and the second shell structure is a B pillar outer and the body structure reinforcement is sandwiched between the B pillar inner and the B pillar outer.

In accordance with an additional aspect, a new and improved method of making a body structure reinforcement is provided. That method comprises the steps of: (a) providing a locking feature on a connecting flange and (b) additive manufacturing a reinforcement body from additive manufacturing material and embedding the locking feature in the additive manufacturing material to lock the reinforcement body and the connecting flange together as a single unitary body.

The method may further include the step of providing a plurality of windows within and at least partially encircled by a margin of the connecting flange and filling the plurality of windows with additive manufacturing material to lock the reinforcement body and the connecting flange together. Still further, the method may include the step of providing a lug on the connecting flange and embedding the lug in the additive manufacturing material of the reinforcement body.

In accordance with still another aspect, a method of making a body structure comprises the steps of: (a) providing a reinforcing component with a reinforcement body and a first connecting flange wherein the reinforcement body and the first connecting flange are integrally formed together as a single unitary piece, (b) providing a first shell structure with a second connecting flange, (c) providing a second shell structure (which may or may not include an internal lattice/biomimicry/organic structure) with a third connecting flange, (d) sandwiching the first connecting flange between the second connecting flange and the third connecting flange and (e) securing the first connecting flange, the second connecting flange and the third connecting flange together to complete construction of the body structure.

That method may further include the step of making the reinforcement body and the first connecting flange by additive manufacturing with an additive manufacturing material.

Alternatively, the method may include the step of making the first connecting flange with a plurality of windows from a first material and then additive manufacturing the reinforcement body from an additive manufacturing material wherein a portion of the additive manufacturing material extends through the plurality of windows to lock the reinforcement body and the first connecting flange together as a single unitary body. Still further, the method may include defining the plurality of windows within and at least partially encircled by a margin of the connecting flange covered by the additive manufacturing material.

In the following description, there are shown and described several preferred embodiments of the new and improved body structure reinforcement, new and improved body structure incorporating that body structure reinforcement as well as the new and improved methods of making the body structure reinforcement and the body structure. As it should be realized, the body structure reinforcement, the body structure and the related methods are capable of other, different embodiments and its several details are capable of modification in various, obvious aspects all without departing from the body structure reinforcement, the body structure and the methods as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the body structure reinforcement, body structure and methods, and together with the description serves to explain certain principles thereof.

Reference will now be made in detail to the present preferred embodiments of the body structure reinforcement and the body structure incorporating that body structure reinforcement, examples of which are illustrated in the accompanying drawing figures.

DETAILED DESCRIPTION

Figure 1:
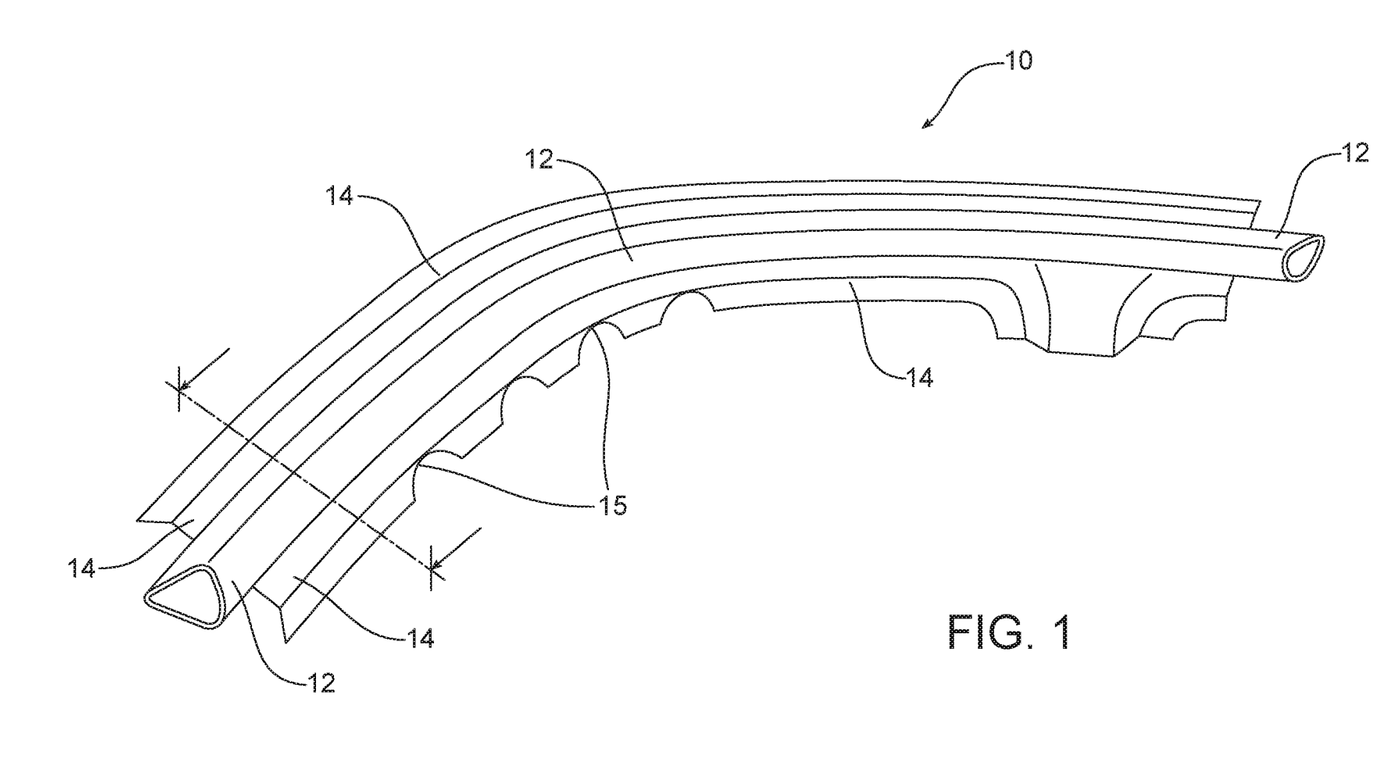
FIG. 1 is a perspective view of one possible embodiment of the new and improved body structure reinforcement including a reinforcement body and a connecting flange integral with the reinforcement body.

Reference is now made to FIG. 1 which illustrating one possible embodiment of the new and improved body structure reinforcement 10. That body structure reinforcement 10 includes a reinforcement body 12 and a connecting flange 14 integral with the reinforcement body. In the embodiment illustrated in FIG. 1, the reinforcement body 12 is an elongated tubular structure that may have an acircular, a circular or a polygonal cross-section with any number of sides. The flange 14 may also include optional scallops 15 as shown. As will become apparent in the following description, the connecting flange 14 provides efficient, cost attractive, lower-capital disruption to the auto industry by allowing the novel body structure reinforcement 10 to be joined easily to the body of the motor vehicle into which the body structure reinforcement is to be incorporated.

Figure 2:
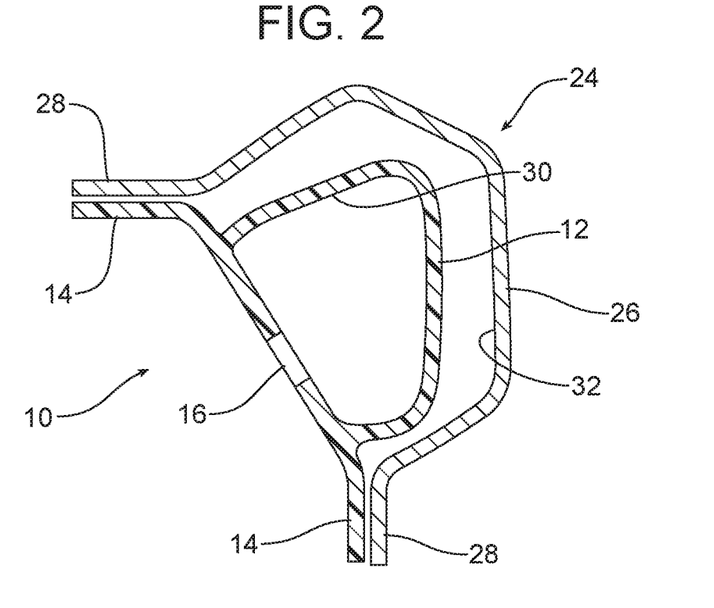
FIG. 2 is a cross-sectional view of one possible embodiment of the body structure reinforcement incorporated into a body structure including a body side outer so as to form a roof rail.

In one possible embodiment of the body structure reinforcement 10 illustrated in FIG. 2, the reinforcement body 12 and the connecting flange 14 are formed as a single unitary body by additive manufacturing from any additive manufacturing material appropriate for application in the printing of a body structure reinforcement for motor vehicles or autonomous vehicles. Such additive manufacturing materials include, but are not necessarily limited to stainless steel, titanium, nickel, carbon fiber and combinations thereof.

A body structure reinforcement additive manufactured from steel may, for example, have a wall thickness of between 0.5 and 2.8 mm, a yield strength of between 100 and 1800 MPa and an ultimate strength of between 250 and 2200 MPa. In contrast, a body structure reinforcement additive manufactured from aluminum may, for example, have a wall thickness of between 0.8 and 3.5 mm, a yield strength of between 90 and 210 MPa and an ultimate strength of between 205 and 325 MPa. The single unitary body of the body structure reinforcement 10 illustrated in FIG. 2 may include one or more tooling locators 16 such as a hole or slot to allow for the use of conventional tooling used in the assembly of the motor vehicle.

Figure 3:
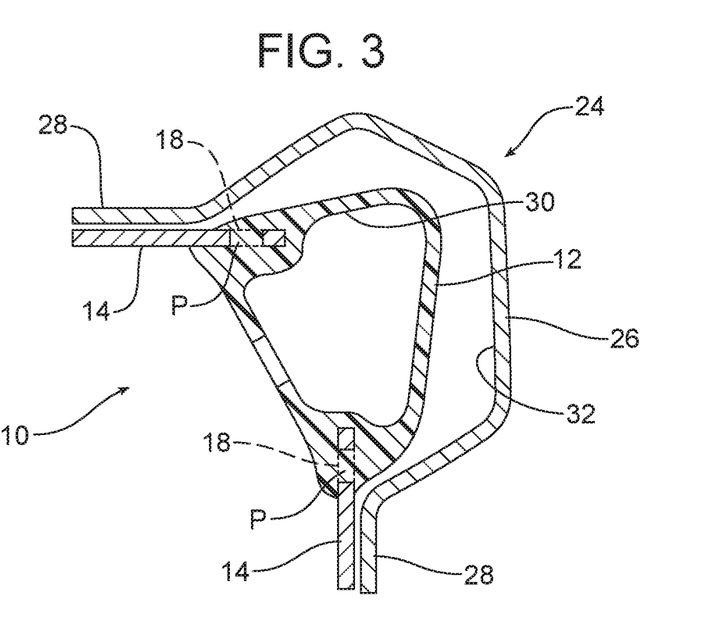
FIG. 3 is a view similar to FIG. 2 but showing an alternative embodiment of the body structure reinforcement incorporated into a body structure including a body side outer so as to form a roof rail.
Figure 4A:
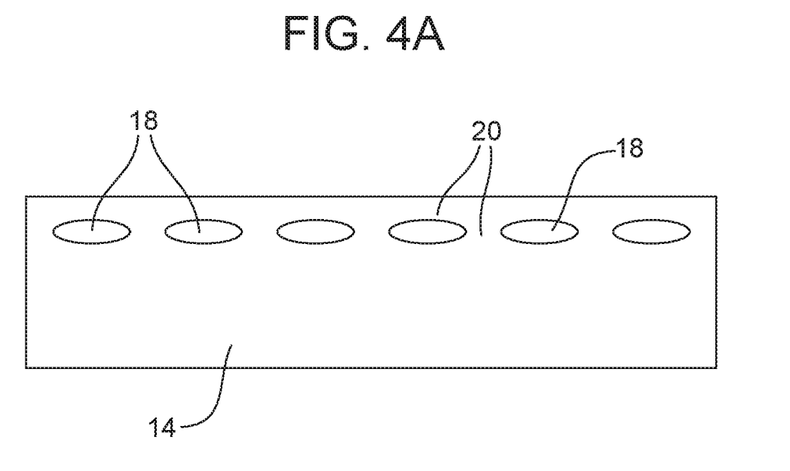
FIG. 4A is a detailed side view of one possible embodiment of the connecting flange incorporating a plurality of windows that are fully outlined by a margin of the connecting flange.
Figure 5A:
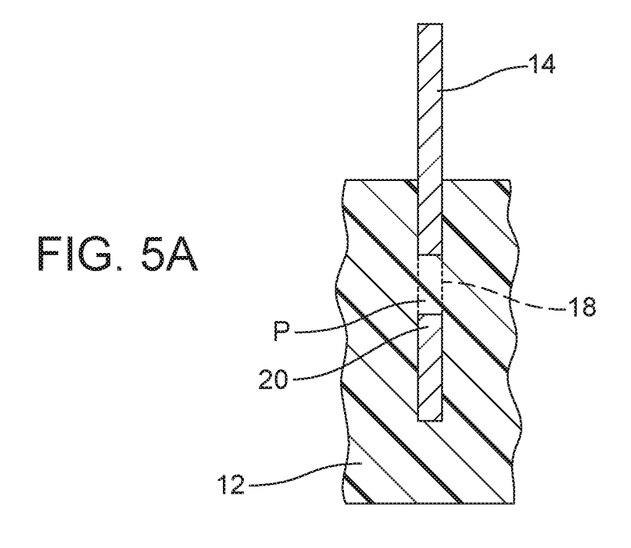
FIG. 5A is a detailed cross-sectional view of a body structure reinforcement illustrating a first construction for securing the reinforcement body and the connecting flange of the body structure reinforcement into a single unitary body.

In an alternative embodiment of the body structure reinforcement 10 illustrated in FIG. 3, the connecting flange 14 may be a separate metal component from the additive manufactured reinforcement body 12. In this embodiment, the connecting flange 14 may be secured to the reinforcement body 12 so as to form a single unitary body in a number of ways. More particularly, as illustrated in FIGS. 3, 4A and 5A, the connecting flange 14 may include a locking feature in the form of a plurality of windows 18 that are within and at least partially encircled by a margin 20 of the connecting flange defining the outlines of the plurality of windows. In FIG. 4A, a total of six windows 18 are shown and those windows are oblong or elliptical in shape. Here it should be appreciated that substantially any number of windows 18 and any number of alternative shapes may be utilized.

Figure 4B:
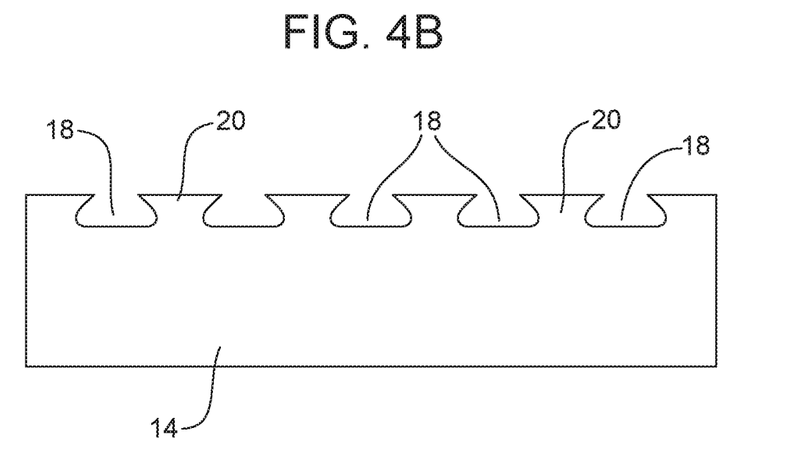
FIG. 4B is a view of an alternative embodiment of the connecting flange wherein the windows are scallops partially outlined by the margin of the connecting flange which forms intermittent dovetail-shaped sections between the scallops.

In FIG. 4B, the windows 18 formed in the connecting flange 14 are only partially encircled by the margin 20 of the connecting flange. Thus, the connecting flange 14 has a scalloped appearance with the margins 20 assuming a dovetail shape between adjacent windows 18.

In the embodiment of the body structure reinforcement 10 illustrated in FIG. 3 and in more detail in FIG. 5A, the connecting flange 14 is secured together with the reinforcement body 12 by additive manufacturing the reinforcement body on the connecting flange from an additive manufacturing material. More particularly, a portion P of that additive manufacturing material extends through the plurality of windows 18 to lock the reinforcement body 12 and connecting flange 14 together as a single unitary body.

Figure 5B:
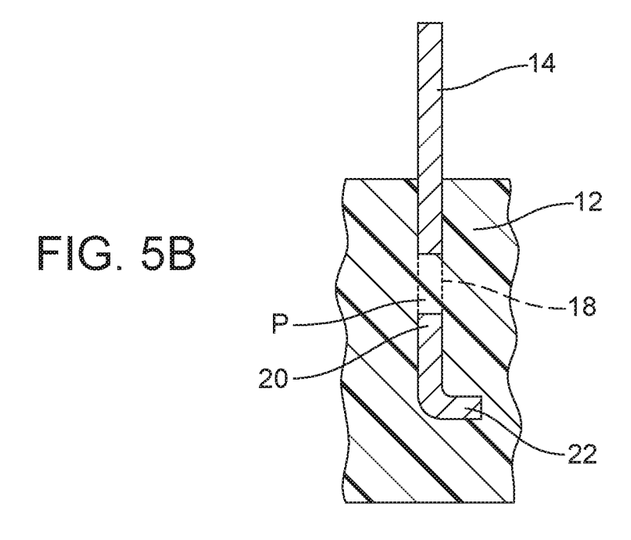
FIG. 5B is a view similar to FIG. 5A but illustrating a second construction for the same purpose.

In the alternative embodiment illustrated in FIG. 5B, the locking feature for locking the reinforcement body 12 and the connecting flange 14 together not only includes the plurality of windows 18, but also a lug 22 provided at the proximal end of the connecting flange that is embedded in the additive manufacturing material when the reinforcement body is additive manufactured. Thus, in the FIG. 5B embodiment, interlocking between the reinforcement body 12 and the connecting flange 14 is provided by additive manufacturing material of the reinforcement body extending through the windows 18 and embedding and holding the lug 22.

Figure 5C:
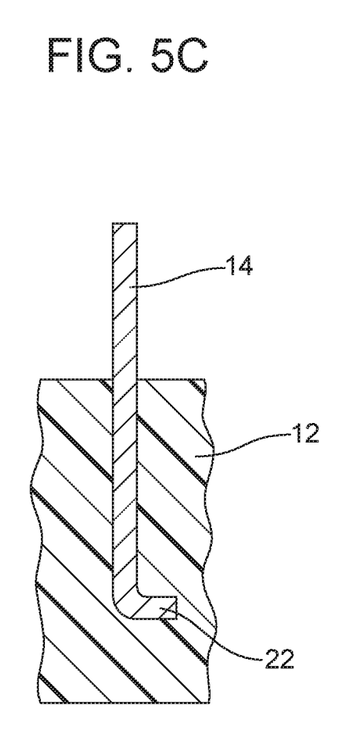
FIG. 5C is a view similar to FIGS. 5A and 5B but illustrating a third construction for the same purpose.

In the embodiment illustrated in FIG. 5C, the locking feature comprises only the lug 22 embedded in the additive manufacturing material of the reinforcement body 12 in the absence of any windows 18.

Reference is again made back to FIGS. 2 and 3 which illustrate one possible body structure 24 in the form of a roof rail. The roof rail/body structure 24 includes the body structure reinforcement 10 previously described and a first shell structure 26 in the form of a body side outer. That first shell structure 26 includes a second connecting flange 28. As should be appreciated, the reinforcement bodies 12 of the body structures 24 illustrated in FIGS. 2 and 3 are reinforcing tubes 30 and the first connecting flanges 14 of the body structure reinforcements extend from those reinforcing tubes 30.

When the roof rail/body structure 24 is assembled, the first connecting flanges 14 of the body structure reinforcement 10 are aligned with the second connecting flanges 28 of the first shell structure 26 and joined together by any appropriate means known in the art of vehicle construction for securing metal flanges of body shell structures together. When joined, the reinforcing tube 30 of the reinforcement body 12 nests within the cavity 32 formed by the body side outer/first shell structure 26.

Figure 6:
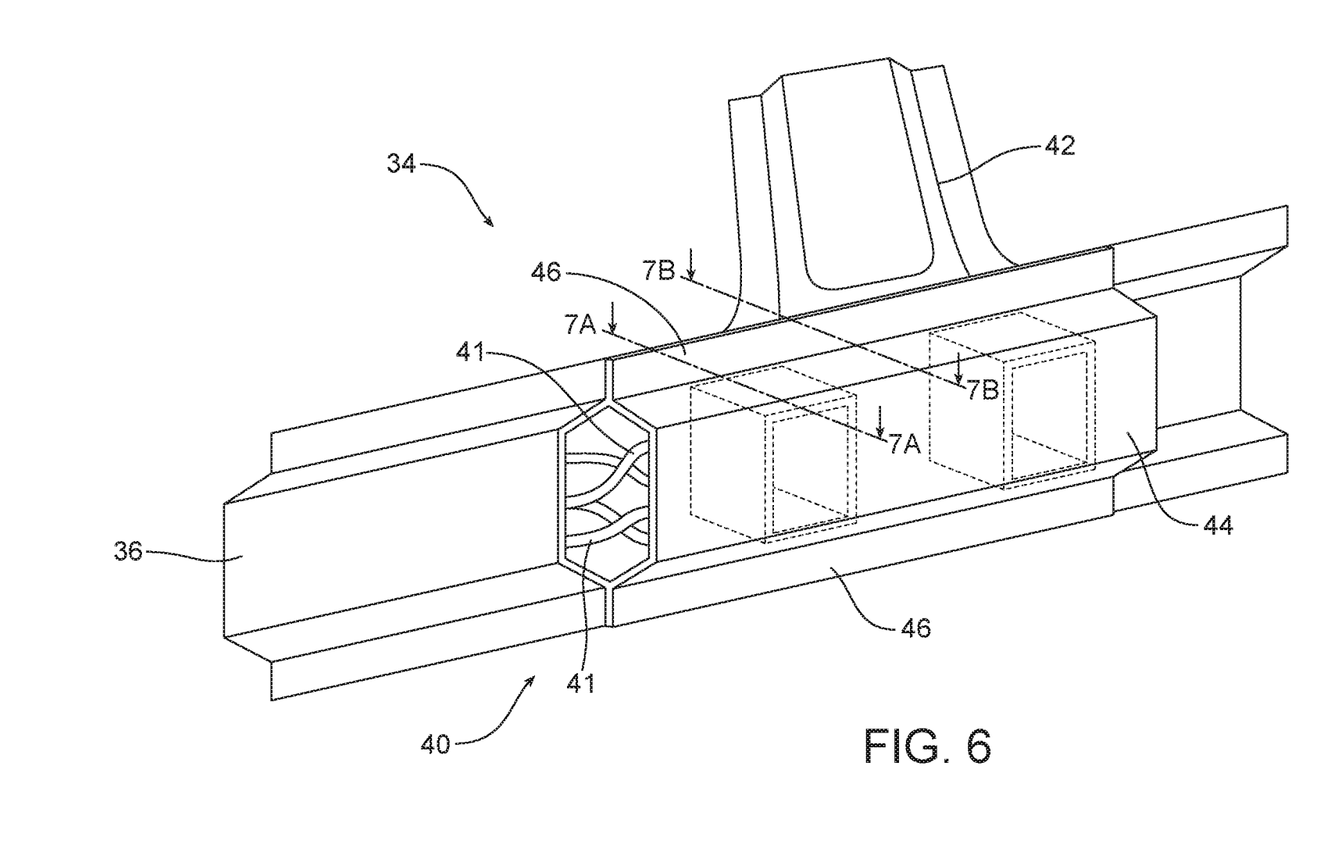
FIG. 6 is a detailed perspective view of a body structure in the form of a B pillar and rocker node constructed in accordance with the teachings of this document.
Figure 7A:
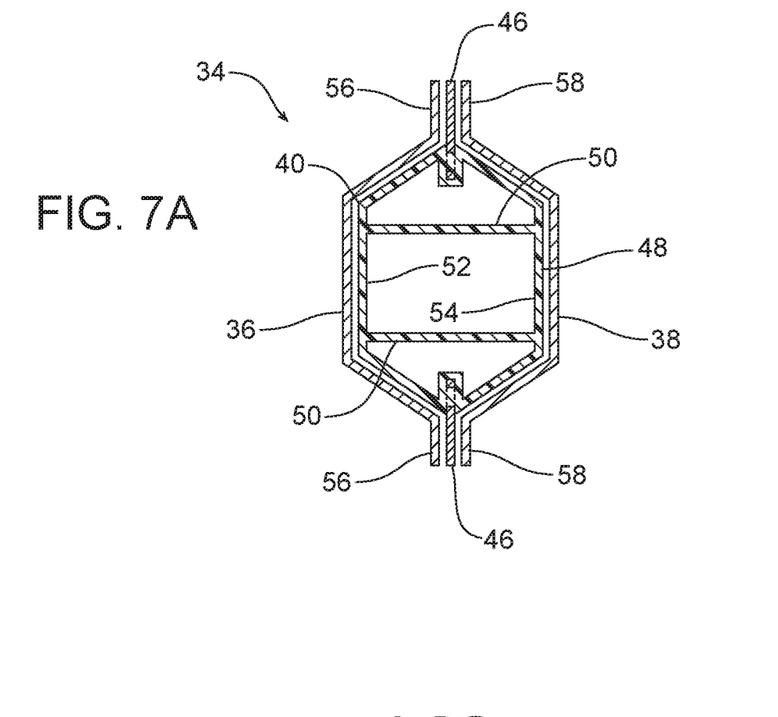
FIGS. 7A and 7B are respective cross-sectional views through lines 7A-7A and 7B-7B of FIG. 6.
Figure 7B:
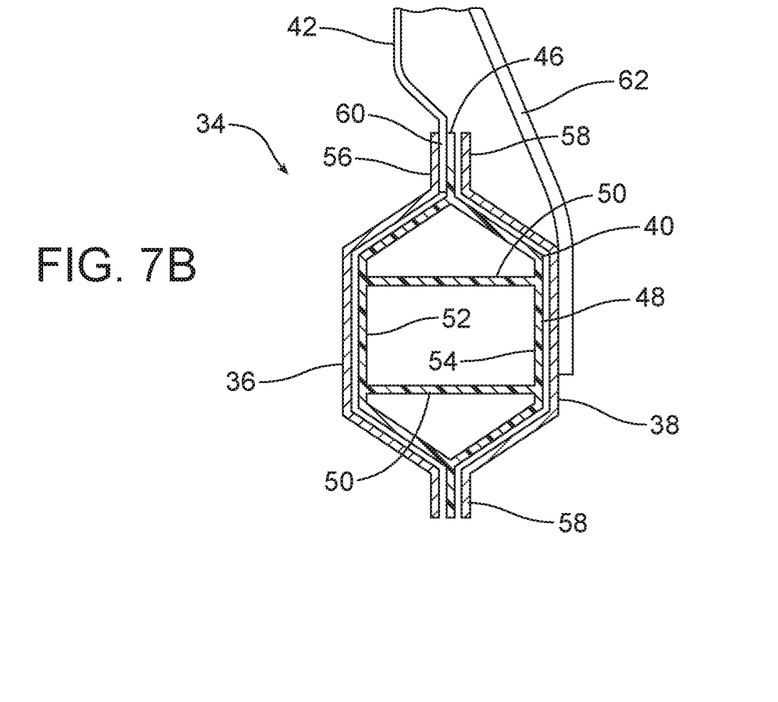

Reference is now made to FIGS. 6, 7A and 7B illustrating yet another body structure 34 including a first shell structure 36 in the form of a floor side inner, a second shell structure 38 in the form of a rocker outer, a body structure reinforcement 40 in the form of a lower B pillar node and a third body shell structure 42 in the form of a B pillar inner. Note, for purposes of clarity, the rocker outer/second shell structure 38 is not illustrated in FIG. 6 as it would conceal the body structure reinforcement 40.

The body structure reinforcement 40 includes a reinforcement body 44 and a first connecting flange 46. More particularly, the reinforcement body 44 may take the form of a bulkhead reinforcement including an outer casing 48 and a plurality of reinforcing ribs 50 extending between the inner wall 52 and the outer wall 54 of that outer casing.

The reinforcement body 40 may also include an optional internal lattice 41 which acts as a local structural reinforcement to help manage and balance loading conditions. The internal lattice 41 is easily incorporated into the body structure reinforcement 40 at any desired location during the additive manufacturing process.

The first shell structure 36 comprises a floor side inner having a second connecting flange 56. The second shell structure 38 is a rocker outer having a third connecting flange 58. The third shell structure 42 is a B pillar inner having a fourth connecting flange 60. The first shell structure 36, the second shell structure 38 and the third shell structure 42 are all made by stamping from aluminum, steel or other appropriate material in accordance with methods known in the art.

When the body structure reinforcement 40, the first shell structure 36, the second shell structure 38 and the third shell structure 42 are all properly oriented and aligned, the first connecting flange 46, the second connecting flange 56, the third connecting flange 58 and the fourth connecting flange 60 are then secured together by mechanical joining such as welding or other appropriate mechanical joining methods known in the art.

As illustrated in FIG. 7B, the upper seam of the body structure 34 includes the second connecting flange 56 of the first shell structure 36 in the innermost position, the fourth connecting flange 60 of the third shell structure 42 in the next innermost position, the first connecting flange 46 of the body structure reinforcement 40 in the next outermost position and the third connecting flange 58 of the second shell structure 38 in the outermost position. Accordingly, it should be appreciated that the fourth connecting flange 60 is sandwiched between the second connecting flange 56 and the first connecting flange 46 while the first connecting flange 46 is sandwiched between the fourth connecting flange 60 and the third connecting flange 58.

At the bottom seam of the body structure 34, the first connecting flange 46 is sandwiched between the second connecting flange 56 of the first shell structure 36 on the inside and the third connecting flange 58 of the second shell structure 38 on the outside. FIG. 7B also illustrates a fifth shell structure 62, the B pillar outer, which overlaps and is joined in a manner known in the art with the second shell structure or rocker outer 38.

Figure 8:
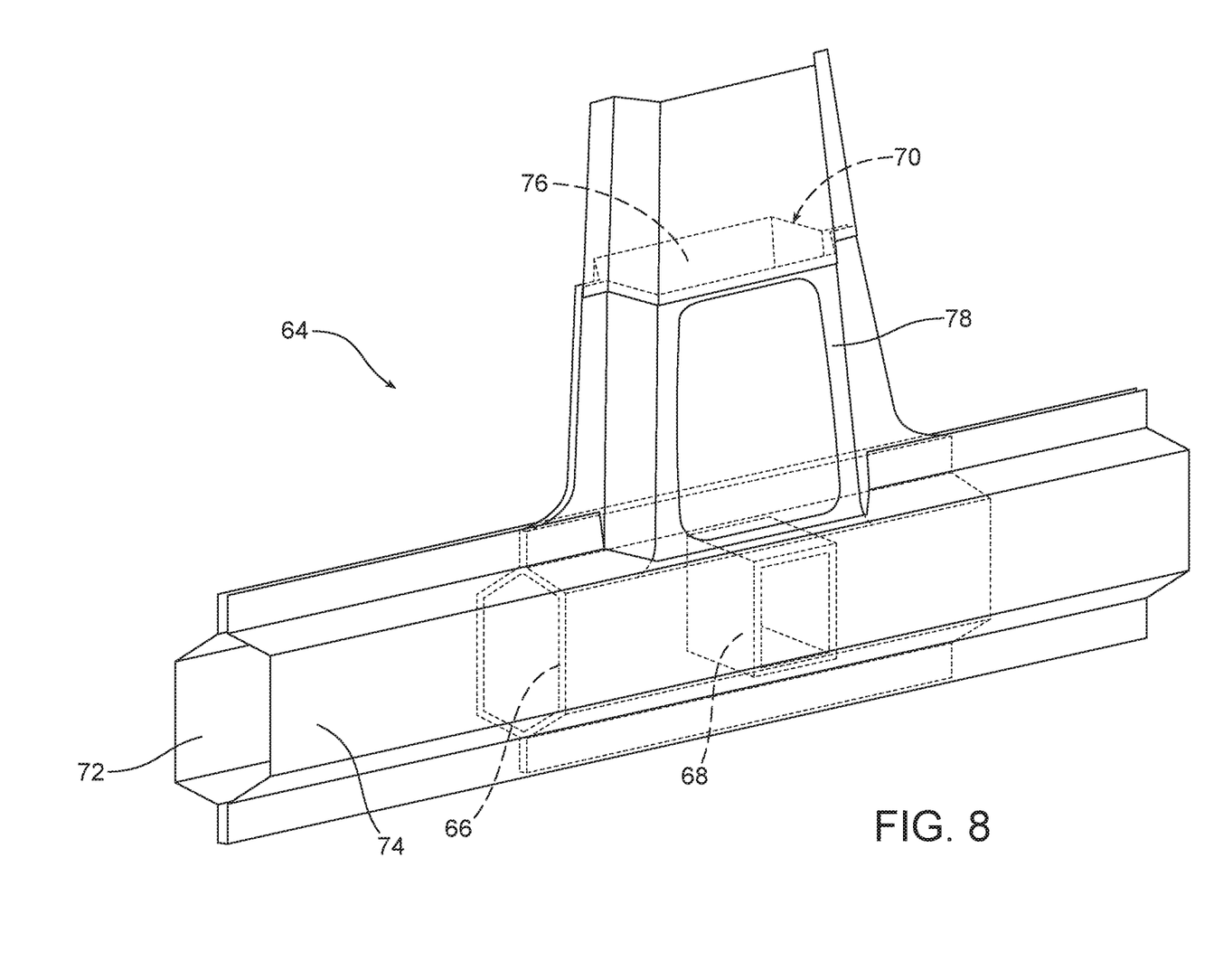
FIG. 8 is a perspective view of an alternative embodiment of a lower B pillar node.
Figure 9:
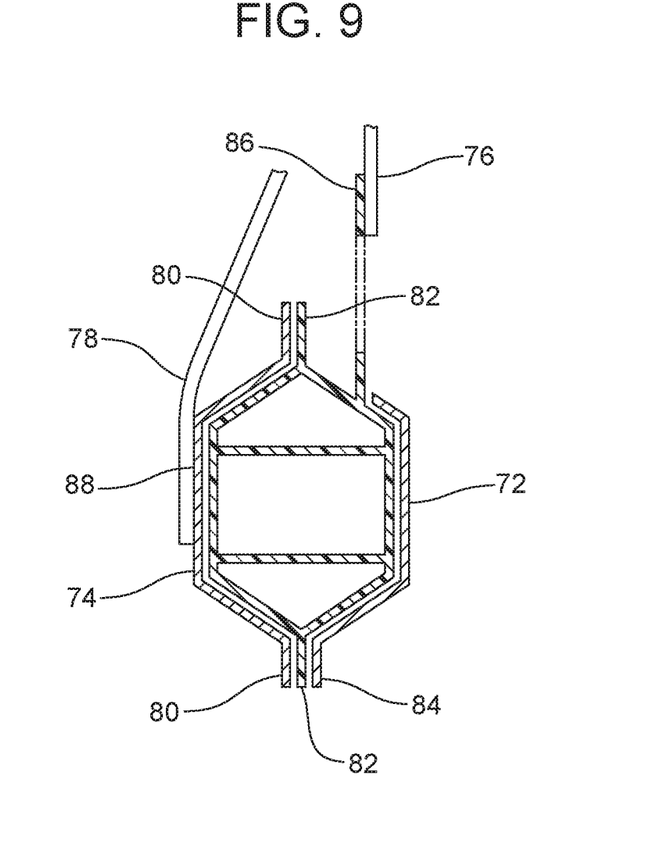
FIG. 9 is a cross-sectional view of the alternative embodiment of B pillar node illustrated in FIG. 8.

FIGS. 8 and 9 illustrate yet another body structure 64 including a reinforcement body 66 including a single bulkhead reinforcement 68 located below the B-pillar 70. The body structure 64 also includes a first shell structure 72 in the form of a floor side inner, a second shell structure 74 in the form of a rocker outer, a third shell structure 76 in the form of a B-pillar inner and a fourth shell structure 78 in the form of a B-pillar outer.

As best illustrated in FIG. 9, the connecting flange 80 on the rocker outer/second shell structure 74 is connected to the connecting flange 82 on the reinforcement body 66 at the top and bottom. The connecting flange 84 on the floor side inner/first shell structure 72 is connected to the connecting flange 82 of the reinforcement body 66 at the bottom. The B-pillar inner/third shell structure 76 is connected to the extended connecting flange 86 of the reinforcement body 66. Finally, the B-pillar outer/fourth shell structure 78 is connected to the outer face 88 of the rocker outer/second shell structure 74.

Figure 10:
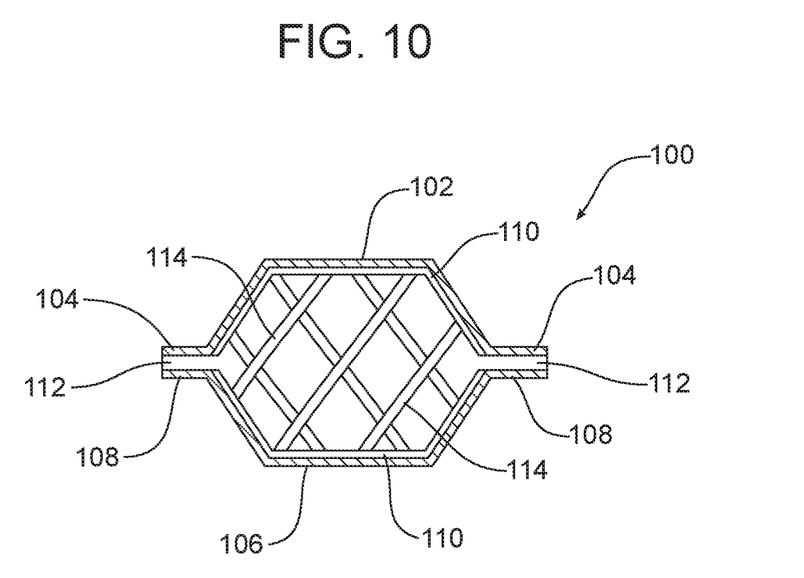
FIG. 10 is a cross-sectional view of a body structure in the form of a reinforced B-pillar.

FIG. 10 illustrates a body structure 100 in the form of a reinforced B-pillar. That reinforced B-pillar/body structure 100 includes (a) a first shell structure/B-pillar inner 102 having a connecting flange 104, (b) a second shell structure/B-pillar outer 106 having a connecting flange 108 and a body structure reinforcement 110 having a connecting flange 112 and internal lattice reinforcement 114. The connecting flanges 104, 108 and 112 are all aligned and connected as indicated with the connecting flange 112 of the body structure reinforcement 110 secured between the connecting flanges 104, 108 of the respective B-pillar inner 102 and B-pillar outer 106. Thus, the body structure reinforcement 110 is sandwiched between the first shell structure/B-pillar inner 102 and the second shell structure/B-pillar outer 106.

Consistent with the above description, a method of making a body structure reinforcement 10 comprises providing a locking feature 18 and/or 22 on the connecting flange 14 and additive manufacturing the reinforcement body 12 from additive manufacturing material and embedding the locking feature in the additive manufacturing material to lock the reinforcement body and the connecting flange together as a single unitary body. In some embodiments, the method includes providing a plurality of windows 18 within and at least partially encircled by a margin 20 of the connecting flange 14 and filling the plurality of windows with the portion P of additive manufacturing material to lock the reinforcement body and the connecting flange 14 together as a single unitary body. The method may also include providing a lug 22 on the proximal end of the connecting flange 14 and embedding that lug 22 in the additive manufacturing material of the reinforcement body 12.

A method of making a body structure 34 is also provided. That method comprises providing a body structure reinforcement 40 with a reinforcement body 44 and a first connecting flange 46 wherein the reinforcement body and the first connecting flange are integrally formed together as a single unitary piece. The method also includes the steps of providing the first shell structure 36 with a second connecting flange 56, providing the second shell structure 38 with a third connecting flange 58, sandwiching the first connecting flange between the second connecting flange and the third connecting flange and securing the first connecting flange, the second connecting flange and the third connecting flange together such as shown along the bottom seam of the body structure 34 illustrated in FIG. 7B.

As illustrated in FIG. 2, the body structure reinforcement 40 including both the reinforcement body 44 and the first connecting flange 46 may be made by additive manufacturing with an additive manufacturing material. In an alternative embodiment such as illustrated in FIG. 4A, the method may include making the connecting flange 14 with a plurality of windows 18 from a separate piece of metal. Further, the method may include the step of additive manufacturing the reinforcement body 12 from an additive manufacturing material wherein a portion P of the additive manufacturing material extends through the plurality of windows 18 to lock the reinforcement body 12 and the connecting flange 14 together as a single unitary body. As best illustrated in FIG. 5A, the method may also include defining the plurality of windows 18 within and at least partially encircled by a margin 20 of the connecting flange 14 covered by the additive manufacturing material M.

The additive manufactured body structure reinforcement 10 described in this document provides significantly more flexibility to be designed to fit within reduced body structure sections while still being capable of providing necessary stiffness and load carrying capability. Additive manufacturing provides the flexibility to design body structure reinforcements 10 of unique geometry, shape and size that will enable designers to more efficiently locate and place components and are local reinforcements to achieve an overall more efficient body structure. Advantageously, the additive manufactured body structure reinforcement 10 has the ability to be assembled with current or existing assembly tooling to maintain "manufacturing bill of process" to avoid new or additional tooling. Lattice structures may also be provided to place material only where it is needed and best manage loads and distribute load input stresses. Part count reductions, vehicle performance improvements, overall vehicle cost reductions and system integrations are also possible through the integration of multiple parts typically used in body structure construction. Thus, the body structure reinforcement 10 and the body structures 24, 34 described herein provide wide-ranging benefits and advantages and thereby represent a significant advance in the art.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A body structure, comprising:
a body structure reinforcement having a reinforcement body and a first connecting flange wherein said reinforcement body and said first connecting flange are a single unitary body; and
a first shell structure having a second connecting flange wherein said first connecting flange is secured to said second connecting flange, wherein said first shell structure is a body side outer and said reinforcement body includes a reinforcing tubular shaped structure.

2. The body structure of claim 1, wherein said reinforcement body and said first connecting flange are the single unitary body formed by additive manufacturing.

3. The body structure of claim 1, wherein said first connecting flange is a metal component including a plurality of windows and said reinforcement body is additive manufactured from an additive manufacturing material and includes portions of said additive manufacturing material extending through said windows.

4. The body structure of claim 3, wherein said first connecting flange includes a lug embedded in said additive manufacturing material.

5. The body structure of claim 1, wherein said first connecting flange is a metal component including a lug embedded in said additive manufacturing material.

6. The body structure of claim 1, further including a second shell structure having a third connecting flange wherein said first connecting flange is sandwiched between said second connecting flange and said third connecting flange.

7. The body structure of claim 6, wherein said first shell structure is a floor side inner and said second shell structure is a rocker outer.

8. The body structure of claim 7, wherein said body structure further includes a B-pillar inner having a fourth connecting flange connected to said first connecting flange, said second connecting flange and said third connecting flange.

9. The body structure of claim 8, wherein said reinforcement body is a B-pillar node connecting and reinforcing said B-pillar inner, said floor side inner and said rocker outer.

10. The body structure of claim 9, wherein said reinforcement body includes a first bulkhead reinforcement and a second bulkhead reinforcement held in an outer casing.

11. A body structure reinforcement, comprising a reinforcement body and a connecting flange integral with said reinforcement body, wherein said connecting flange includes a plurality of windows.

12. The body structure reinforcement of claim 11 wherein said reinforcement body and said connecting flange are formed as a single unitary body by additive manufacturing.

13. The body structure reinforcement of claim 11, wherein said reinforcement body is additive manufactured from an additive manufacturing material and a portion of said additive manufacturing material extends through said plurality of windows to lock said reinforcement body and said connecting flange together as a single unitary body.

14. The body structure reinforcement of claim 13, wherein said connecting flange includes a lug embedded in said additive manufacturing material.

15. The body structure reinforcement of claim 11, wherein said reinforcement body is additive manufactured from an additive manufacturing material and said connecting flange includes a lug embedded in said additive manufacturing material of said reinforcement body.

16. A method of making a body structure reinforcement, comprising:
providing a locking feature on a connecting flange; and
additive manufacturing a reinforcement body from additive manufacturing material and embedding said locking feature in said additive manufacturing material to lock said reinforcement body and said connecting flange together as a single unitary body.

17. The method of claim 16, providing a plurality of windows within and at least partially encircled by a margin of said connecting flange and filling said plurality of windows with additive manufacturing material to lock said reinforcement body and said connecting flange together.

18. The method of claim 17, including providing a lug on said connecting flange and embedding said lug in said additive manufacturing material of said reinforcement body.

* * * * *